A. P. GERALD.
TOOL FOR SPREADING BOILER TUBES.
APPLICATION FILED APR. 22, 1909.
968,338.
Patented Aug. 23, 1910.
2 SHEETS—SHEET 2.
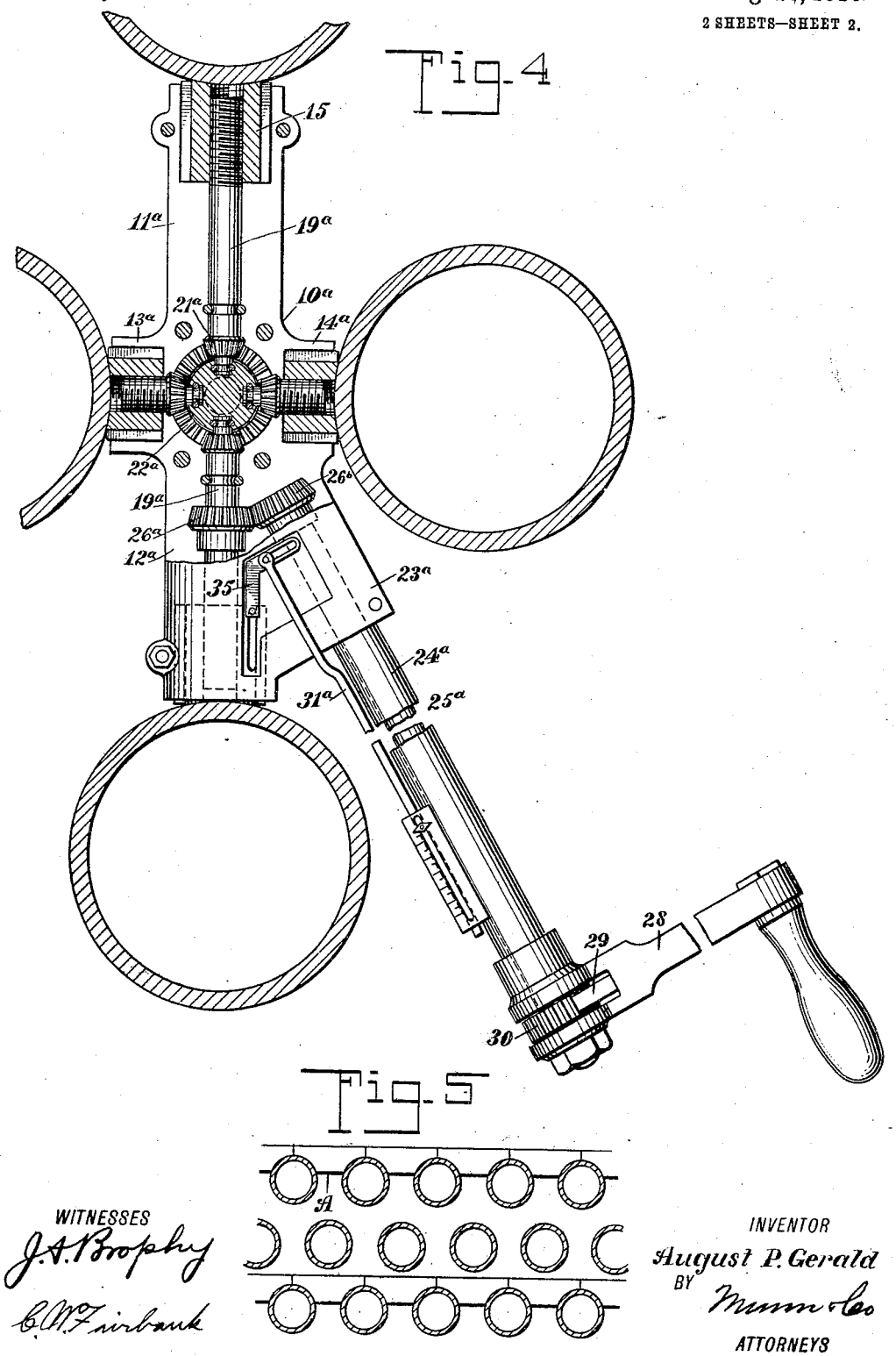
WITNESSES
INVENTOR
August P. Gerald
BY
ATTORNEYS

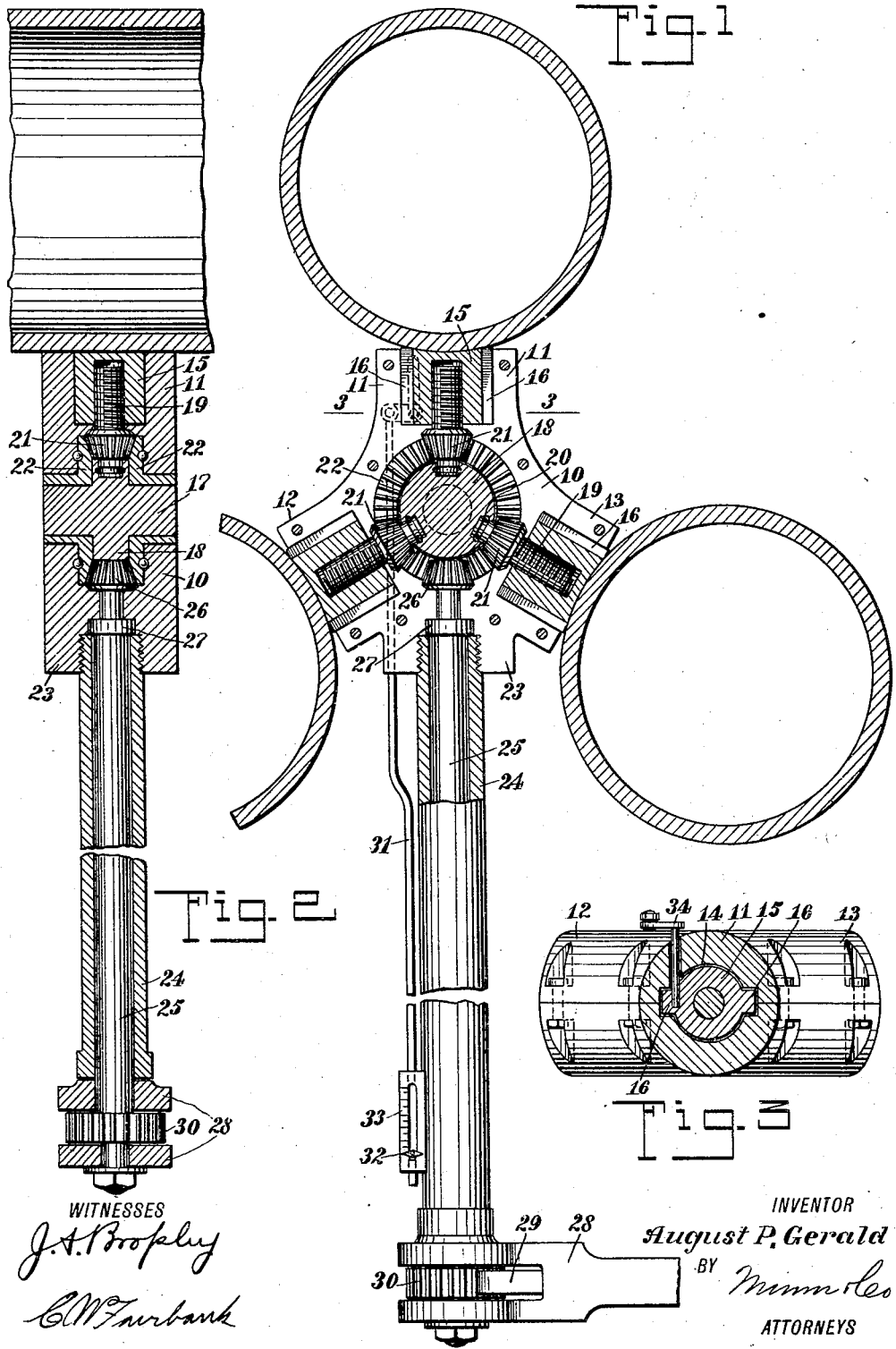

UNITED STATES PATENT OFFICE.

AUGUST P. GERALD, OF JERSEY CITY, NEW JERSEY.

TOOL FOR SPREADING BOILER-TUBES.

968,338.  Specification of Letters Patent.  Patented Aug. 23, 1910.

Application filed April 22, 1909. Serial No. 491,493.

*To all whom it may concern:*

Be it known that I, AUGUST P. GERALD, a citizen of the United States, and a resident of Jersey City, in the county of Hudson and State of New Jersey, have invented a new and Improved Tool for Spreading Boiler-Tubes, of which the following is a full, clear, and exact description.

This invention relates to certain improvements in tools for spreading the tubes of water-tube boilers, and more particularly to an improved operating means for moving the active members radially in respect to the tubes to be spread.

My invention also involves a new tool for spreading the tubes to facilitate the insertion of horizontal baffle bricks.

By means of my improved mechanism, all of the operating members of the tool may be forced outwardly or drawn inwardly simultaneously and to equal extents.

Reference is to be had to the accompanying drawings, forming a part of this specification, in which similar characters of reference indicate corresponding parts in all the figures, and in which—

Figure 1 is a section through a tool constructed in accordance with my invention and adapted for spreading apart the tubes for the insertion of horizontal baffle bricks; Fig. 2 is a central longitudinal section through the tool shown in Fig. 1; Fig. 3 is a transverse section on the line 3—3 of Fig. 1; Fig. 4 is a longitudinal section through a tool operating upon substantially the same principle but adapted for the spreading apart of tubes for the insertion of vertical baffle bricks; and Fig. 5 is a horizontal section through a portion of a boiler showing two rows of horizontal baffle bricks.

Certain of the features of my improved tool are similar to those disclosed in my prior application, Serial No. 488,159, filed April 6, 1909, but instead of operating the active members by fluid pressure, I provide an improved form of gearing so designed that all of the active members will be operated simultaneously and radially in respect to their corresponding boiler tubes.

In the specific form of tool illustrated in Figs. 1, 2 and 3, I employ a body 10 having three outwardly-extending arms 11, 12 and 13, spaced one hundred and twenty degrees from each other, and all lying in the same plane. The body may be formed of two separate sections bolted together, as illustrated in Fig. 3, or may be made of any other suitable number of pieces held rigid in respect to each other. Each arm is provided with a central passage 14, extending longitudinally thereof, and within each passage is a plunger or active member 15, movable longitudinally of the passage and arm. The plunger or active member has its outer end or face curved to correspond to the curvature of the boiler tube, and the plunger is held against rotation in any suitable manner, as, for instance, by means of flanges 16, 16, extending longitudinally of the plunger along opposite sides. The longitudinal center lines or axes of the three plungers, if extended, would meet in a point at the center of the body 10, and concentric with this point is a bearing member 17 extending transversely of the body at right angles to the plane of said center lines or axes of the plungers. This bearing member 17 is provided with an annular flange 18 intermediate its ends and constituting an abutment for the spreading members which operate to force the plungers outwardly. Each of these spreading members 19 has a threaded portion extending into a threaded central passage in the corresponding plunger 15. The inner end 20 of each spreading member extends into a socket or opening in the flange 18, and is free to rotate therein, but is held against removal therefrom or against any longitudinal movement in respect to said flange. Any suitable means may be employed for holding the spreading members in the flange 18 of the abutment member; for instance, each end 20 may be provided with an annular groove receiving a split ring, which, when the spreading member is in position, will extend into a corresponding groove in the socket. Each spreading member is provided with a bevel pinion 21, by means of which it may be rotated within its corresponding plunger, to force the latter longitudinally due to the threaded engagement of the spreading member and the plunger. Encircling the abutment member 17 upon opposite sides of the central flange 18, are two bevel gear wheels 22, 22, each having engagement with all of the pinions 21, whereby all of the pinions are caused to rotate simultaneously. For reducing the end thrust upon the gear wheels 22, suitable ball bearings may be provided between the outer faces of the gear wheels and the adjacent portions of the body 10. In the same plane with the three arms 11, 12 and 13, and intermediate two of them, for instance, the arms 12 and 13, I provide a fourth arm 23, to which is secured a tubular handle 24. Extending through the tubular handle is a shaft or rotatable rod 25, and on the inner end of this shaft or rod is a pinion 26 corresponding in size to the pinions 21, and disposed intermediate the two gear wheels 22, 22 and in engagement with each. The shaft need not necessarily have engagement with the abutment member 17, as the thrust on the pinion 26 is outward rather than inward. The shaft may have a collar 27 abutting against the inner end of the handle 24 or against any other suitable stop, to prevent the pinion 26 from moving out of mesh with the gear wheels. Any suitable means may be provided at the outer end of the handle 24 for rotating the rod; for instance, a lever arm 28 having a dog 29 for engagement with a ratchet wheel 30 on the end of the shaft 25. The lever arm 28, the ratchet and the dog are preferably constructed in any well-known manner, so that the lever arm may be oscillated through a limited space to rotate the shaft in either direction.

At the lower end of the handle 24, I provide an indicator whereby the operator may ascertain the exact position of the plungers, and thus ascertain the exact extent to which the tubes have been spread. This indicator preferably includes a rod 31 extending longitudinally of the handle and having its outer end provided with a pointer 32, movable along a scale 33. The inner end of the rod 31 is connected to one of the plungers 15, preferably the one in alinement with the handle. A pin 34 may constitute a connecting means, and the arm 11 may be provided with a slot through which this pin may operate.

The tool illustrated in Figs. 1, 2 and 3, is adapted for spreading apart the tubes of boilers, to facilitate the insertion of bricks to form a horizontal baffle or partition. The bricks A for forming these partitions are of substantially the form shown in Fig. 5, and each has grooves extending longitudinally adjacent opposite edges and in the lower surfaces, so as to fit two tubes lying in the same horizontal plane. These bricks are of such a thickness that they cannot be inserted between the tubes and turned into position. In order to get the bricks up through between the zigzag tiers of tubes, it is necessary to spread these tubes apart not only horizontally but also vertically, so that the bricks may turn and be moved into the desired position.

The specific form of tool illustrated in Fig. 4, is adapted for accomplishing the same work as the tool illustrated in my previous application above referred to, but I employ substantially the same operating mechanism as that shown in Figs. 1 to 3, inclusive. In the specific form illustrated in Fig. 4, I employ a body $10^a$, having oppositely-disposed arms $11^a$ and $12^a$, in alinement with each other, and oppositely-disposed arms $13^a$ and $14^a$, at right angles to the arms $11^a$ and $12^a$ and in alinement with each other. I employ the same plungers 15 as those previously described, and the plungers are each operated by a rotatable spreading member $19^a$. All of the spreading members are operated by the engagement of pinions $21^a$ on the spreading members with gear wheels $22^a$. For rotating the gear wheels I provide one of the spreading members $19^a$ with an additional pinion $26^a$ intermeshing with a pinion $26^b$ on the inner end of the operating shaft $25^a$. Thus, in this form instead of driving the gear wheels directly, I drive one of the spreading members and this in turn drives the gear wheels and the remaining spreading members. In each case, the gear wheels insure the simultaneous rotation of all of the spreading members. The handle $24^a$ is attached to an arm $23^a$ of the body, which arm is formed as a portion of the arm $12^a$. The indicator shown in Fig. 4 is substantially the same as that illustrated in Fig. 1, save that the upper end of the rod $31^a$ has engagement in a slot in a connecting member 35, which latter is connected by a pin extending through a slot to the plunger nearest the handle. This connecting means is necessary by reason of the angle at which the handle extends in respect to said adjacent plunger.

In each of the two forms of tool illustrated, it will be noted that the plungers move radially in respect to the tubes, and that all of the members are positively moved simultaneously either inwardly or outwardly dependent upon the direction of rotation of the shaft. This is highly desirable inasmuch as it often happens that the plungers or active members in tools of this character, become wedged or bound in place after the spreading of the tubes and do not return to their innermost position upon the release of the fluid pressure in the rear of them or the release of other spreading means which may be employed.

As previously stated, all of the plungers in my improved device operate simultaneously, and preferably they operate at the same rate of speed, but it is evident that the pitch of the threads on the different spreading members may be varied, so that during the simultaneous rotation of all of the spreading members, different plungers will move outwardly at different rates of speed.

Having thus described my invention, I claim as new and desire to secure by Letters Patent:

1. A tool of the character described, comprising a body adapted to be located intermediate a plurality of boiler tubes, active members fitted to move in the body and act radially against said tubes to spread the tubes apart, and gearing for positively operating said active members simultaneously.

2. A tool of the character described, comprising a body or main portion adapted to be located in a group of boiler tubes, active members carried by said body and movable radially in respect to said tubes to spread the latter apart, spreading members having engagement with said active members, and means connecting said spreading members for operating them simultaneously.

3. A tool of the character described, comprising a body or main portion adapted to be located in a group of boiler tubes, active members carried by said body and movable radially in respect to said tubes to spread the latter apart, spreading members having threaded engagement with said active members, and means for operating said spreading members simultaneously.

4. A tool of the character described, comprising a body or main portion adapted to be located in a group of boiler tubes, active members carried by said body and movable radially in respect to said tubes to spread the latter apart, rotatable spreading members having threaded engagement with said active members, and a gear wheel for operating said spreading members simultaneously.

5. In a tool of the character described, the combination of a body, active members carried thereby and adapted to move radially in respect thereto to spread apart a group of boiler tubes, means for preventing the rotation of said active members in respect to said body, spreading members held from longitudinal movement and having threaded engagement with the corresponding active members, a pinion carried by each spreading member, a gear wheel in engagement with all of said pinions, and means for rotating said gear wheel.

6. A tool of the character described, comprising a body adapted to be located intermediate a plurality of boiler tubes, active members fitted to move in the body and act radially against said tubes to spread the tubes apart, mechanical connections for positively operating said active members simultaneously, a handle secured to said body, and an indicator adjacent the outer end of said handle for showing the position of said active members in respect to said body.

7. A tool of the character described, comprising a body adapted to be located intermediate a plurality of boiler tubes, three active members fitted to move in the body and act against said tubes to spread the tubes apart, and mechanical connections for positively operating said active members simultaneously.

8. A tool of the character described, comprising a body adapted to be located intermediate a plurality of boiler tubes, three active members fitted to move in the body and act outwardly against said tubes to spread the tubes apart and spaced equi-distant apart in the same plane, and means carried by said body for moving said members outwardly simultaneously.

9. A tool of the character described, including a body, a plurality of active members carried thereby and movable outward radially, an abutment member centrally disposed in respect to said body, rotatable spreading members having engagement with said abutment member and having threaded engagement with said active members, a handle for said body, and means carried by said handle for rotating said spreading members simultaneously.

In testimony whereof I have signed my name to this specification in the presence of two subscribing witnesses.

AUGUST P. GERALD.

Witnesses:
CLAIR W. FAIRBANK,
PHILIP D. ROLLHAUS.